Sept. 25, 1951 J. RABINOW 2,568,762
AUTO FOCUS ENLARGER
Filed Dec. 8, 1948 2 Sheets-Sheet 1

Inventor
Jacob Rabinow

Sept. 25, 1951 J. RABINOW 2,568,762
AUTO FOCUS ENLARGER
Filed Dec. 8, 1948 2 Sheets-Sheet 2

Inventor
Jacob Rabinow

Patented Sept. 25, 1951

2,568,762

UNITED STATES PATENT OFFICE 2,568,762

AUTOFOCUS ENLARGER

Jacob Rabinow, Takoma Park, Md., assignor to Federal Manufacturing & Engineering Corp., Brooklyn, N. Y., a corporation of New York Application December 8, 1948, Serial No. 64,219

3 Claims. (Cl. 88—24)

This invention relates to photographic enlargers, copying cameras and similar optical devices wherein the focusing is done automatically by means of cams. For this purpose I employ flexible cams of novel construction by means of which the main object of my invention is achieved, namely the production of a high precision auto-focus enlarger at low cost.

Another object of my invention is to provide simple means for adapting the automatic focusing means of my enlarger to changes in lenses, paper easels, and other components that affect the focusing of enlargers and copying cameras.

Figure 1:
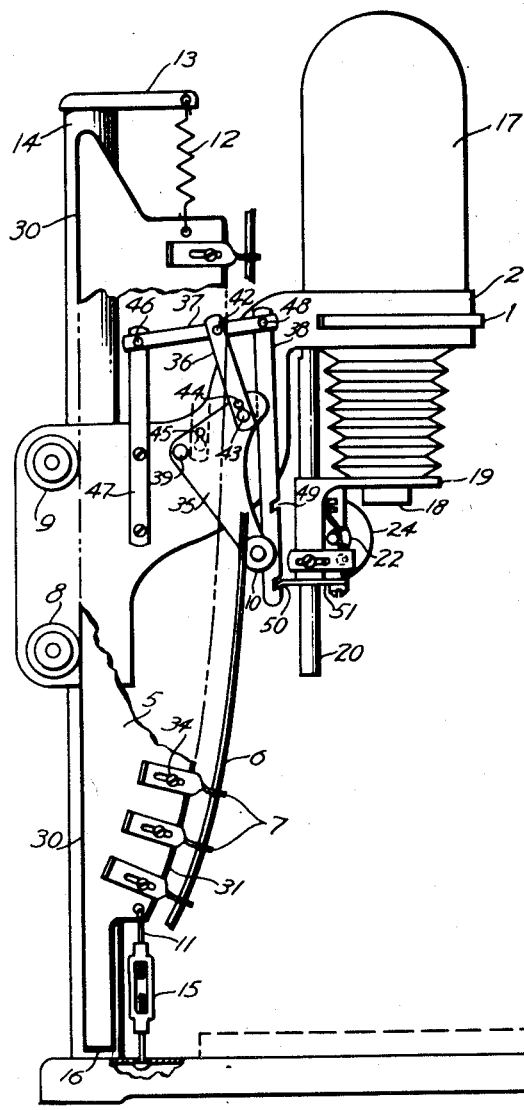
Figure 1 is a side view of the enlarger showing the general arrangement of the main components.

By a photographic enlarger I mean a device now well known to the art whereby an image to be reproduced (usually from a negative) is projected by means of a lens onto a sensitized paper or film and usually enlarged in the process. By a copying camera I mean an instrument practically the reverse of the above where a document to be copied is placed upon some type of table or easel and is photographed by a camera so arranged as to be capable of movement to and from the document.

I am aware that automatic focusing means are well known for such devices, but I believe that the flexible cam shown in my invention constitutes a great improvement in enabling one to construct an inexpensive enlarger of great flexibility and high precision.

As is done in the other devices of this type I use a cam arranged to move the lens to and from the negative holder 1 as the enlarger head 2 is moved away from and toward the baseboard 3 on which a paper easel 4 may be resting.

I am also aware that adjustable cams are known to the art. In some enlargers a rigid cam is arranged to be movable so that exact focus can be obtained for at least two definite positions of the enlarger head. In others a cam consisting of a plurality of rigid sections is employed with the sections movable so that the over-all shape of the cam can be slightly modified.

I do not wish to discuss the difficulties with the first type of adjustable cams, they are too well known. In the cam of the second type the contour can be changed only slightly before the discontinuities of the contour become apparent. Also, it is difficult to see how large changes in cam shape can be achieved, such as may be required if lenses of considerable difference in focal length are to be accommodated. In my cam, however, the use of a flexible strip for the cam surface results in a continuously smooth curve for all possible adjustments of the contour as long as the elastic limit of the strip is not exceeded during the adjusting. In order to facilitate this, I found it desirable to pre-bend the strip to approximately the desired shape before assembling the cam. In this way the bending during the actual adjustment of the enlarger does not at any time approach the elastic limit of the strip and a smoothly varying cam contour automatically results. The strip is held in position longitudinally at only one support, preferably at the top, by notching the sides and having the supporting fork members crimped into these notches. It is important that the strip be free to slide freely through all of the other supports.

The cam used in my invention consists of the main body section 5, a flexible strip 6 forming the cam surface proper, and the holders 7 that attach the flexible strip 6 to the body 5.

The cam body 5 is held in the correct relation to the head 2 by the two wheels 8 and 9 mounted on the head 2, and by a third wheel 10 which is the cam follower. The vertical position of the cam body 5 is defined by the hook 11 anchored to the baseboard 3, and by the tension spring 12 attached to the arm 13 at the top of the supporting stem 14.

The bottom of the cam body 5 is extended to nearly contact the base 3 when the enlarger is adjusted to provide automatic focusing to the baseboard. When an easel is used, the hook 11 is raised by means of the turnbuckle 15 so that the bottom edge 16 of the cam body 5 can be made to just clear the top edge of the easel 4. For easels of other thicknesses, the bottom edge 16 is suitably moved up or down. No other changes in the focusing mechanism need be made.

By locating the cam 5 by the three wheels 8, 9 and 10 as shown, I avoid certain difficulties generally encountered in previous enlargers of this general type where the cam is mounted on the post 14. In the latter construction, play between the head 2 and the post 14 affects the accuracy of focus. In order to overcome this difficulty very precise construction was heretofore required. In my device, loose fit between the post 14 and the head 2 has negligible effect.

It may be noted that I provide no means for preventing the rotation of the head 2 about the post 14. Such rotation will cause the hook 11 to swing and affect the vertical position of the cam 5. This is not desirable, but I found that in normal operation the head 2 is not pivoted enough to affect the focus. The rod 14 can be keyed to the head 2, or the rod can be made other than round, but a round rod has the two great advantages of being inexpensive, and of permitting the head 2 to be swung 180° when it is desired to project the image onto a surface other than the baseboard 3, such as the floor, when the enlarger is standing on a table. It is understood that the cam 5 is removed before such operation.

The operation of the various parts of my enlarger will now be described in detail.

The negative that is to be projected onto the baseboard is held in the negative carrier 1. The illumination is provided by the light housing 17. The lens 18 is carried in the lens board 19 which slides vertically along the lens rod 20. This rod is provided with a groove 21 in which rolls the friction wheel 22 rigidly attached to the focusing shaft 23. A knob 24 is attached to one extremity of this shaft 23 for manual focusing. Two leaf springs 25 and 26 are arranged to press the shaft 23 toward the rod 20 in such a manner as to firmly press the wheel 22 against the bottom of the groove 21. The friction between the lens-board 19 and the rod 20 and of the shaft 23 against the springs 25 and 26 serves to keep the lens board 19 from moving except when deliberately driven by the operation of the knob 24.

Figure 3:
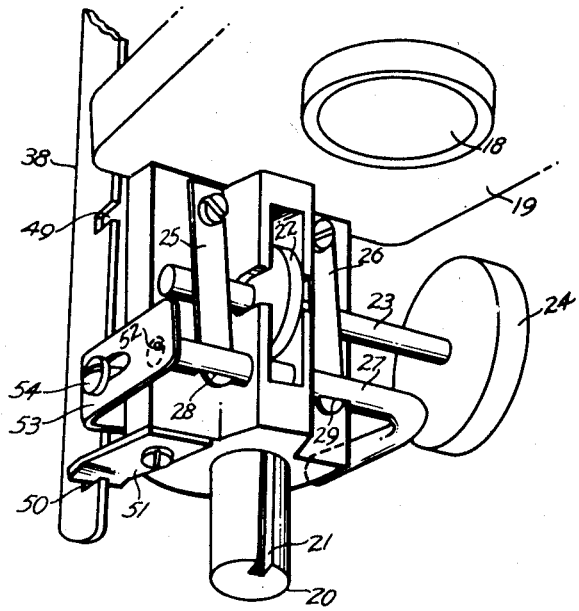
Figure 3 is a perspective view of a portion of the lens-board showing the mechanism for raising and lowering same, both manually and automatically.
Figure 4:
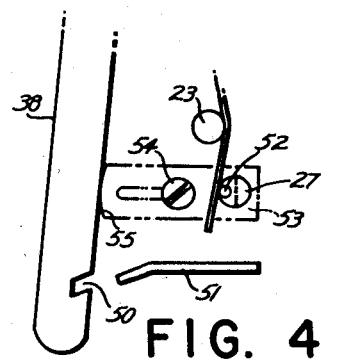
Figure 4 is a schematic view of the lens-board mechanism in the "manual" position.
Figure 5:
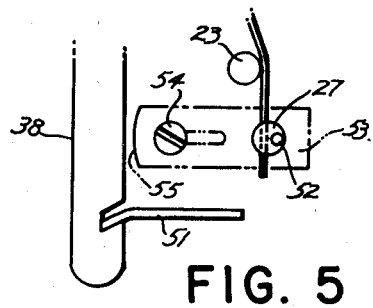
Figure 5 is a schematic of the lense-board mechanism in the automatic position.

For automatic operation, the friction effects described above are undesirable, and I provide a pressure release means in the shaft 27. This shaft is L shaped and is provided with two flats 28 and 29. When the shaft 27 is turned into the position shown in Figures 3 and 5 the springs 25 and 26 press only lightly on the shaft 23 and do not provide sufficient friction to keep the lens board 19 from sliding downward under the force of gravity.

Figure 2:
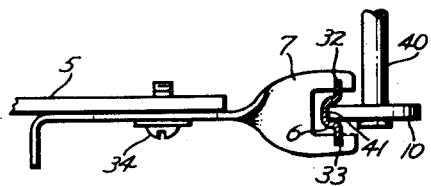
Figure 2 is the plan view of one of the flexible strip supporting members.

The automatic focusing is achieved by the use of the cam described. The cam body 5 is a flat sheet of metal having one straight back edge 30 and a front curved edge 31 approximately parallel to the desired cam surface 6 and approximately one inch short of this required shape. Attached to this cam body 5 is a flexible metal strip 6, preferably made of a springy metal such as steel or brass. The strip is shaped so as to have a groove 41 lengthwise along its center. The strip holders 7 are shown in detail in Figure 2. These holders are also formed of strip material. One end is formed into a fork-like shape. Two notches 32 and 33 are cut into the fingers of this fork. The flexible strip 6 passes through these notches loosely so that no force is exerted on the strip parallel to its long dimension. The holders 7 are attached to the cam body 5 by screws 34 fitted to threaded holes in the body 5.

The lens board 19 is lifted and lowered by the cam strip 6 through the action of the follower wheel 10, the triangular plate member 35, the coupling rod 36, the lever 37, and the lift rod 38. The operation of the focusing mechanism is as follows: The triangular member 35 is rigidly fastened to the shaft 39 which is journalled in the head 2. The follower wheel 10 is mounted on the pivot post 40 rigidly attached to the plate 35.

As the enlarger head 2 is raised and lowered along the post 14, the wheel 10 rides in the groove 41 of the cam strip 6, causing the plate 35 to pivot on the shaft 39. The movement of this plate 35 is communicated to the lever 37 by means of the coupling rod 36. The upper end of this rod 36 has a stud 42 riveted to it. This stud passes through a suitable hole in the lever 37. The lower end of the rod 36 is provided with a keyhole shaped opening 43 which permits the rod to be coupled to the plate 35 by means of either of the two studs 44 or 45. These studs are riveted to the plate 35 and have heads that can slip through the enlarged section of the hole 43 in the rod 36.

For a lens of long focal length, stud 44 is employed, while for a lens of shorter focal length stud 45 is used. Additional intermediate studs may be provided if lenses of more than two focal lengths are to be used.

The lever 37 is journalled at its left end (as viewed in Figure 1) to a stud 46 on the vertical member 47 rigidly fastened to the head 2, while the right hand end is coupled to the lift member 38 by means of another stud 48. This lift member 38 is provided with two notches 49 and 50 that hook over the plate 51 attached rigidly to the lens-board 19. The notch 50 is used with the lens of a long focal length, and notch 49 is employed with a short focal length lens.

When manual focusing is desired, the L-shaped rod 27 is turned so as to apply pressure to the friction springs 25 and 26. One end of the shaft 27 is provided with a short stud 52 formed integrally with the shaft 27. This stud is journalled in a suitable hole in the slider member 53, riding over the screw 54 fastened to the lens-board 19. The end of the member 53 is bent so as to provide a curved surface 55 used to exert force on the notched edge of the lift member 38. The location of the stud 52 is such that when the L-shaped member 27 is rotated into the "manual" position, the lift rod 38 is pushed away from the lens-board 19 and the notches are disconnected from the plate 51. When automatic operation is again desired, the L-shaped rod 27 is turned in the other direction, the spring pressure is released from the wheel 22, the operator manually positions the lens-board so as to make the plate 51 coincide with the desired notch in the member 38, and the latter is hooked over this plate.

I found that during manual operation, the weight of the various members of the automatic focusing mechanisms is more than sufficient to keep the wheel 10 in the cam groove 41 and to keep the cam firmly between the three locating wheels 8, 9 and 10 at all times.

It will be apparent that when a lens of short focal length is used, the linkage described results in a relatively small motion of the lens for a large motion of the cam follower wheel 10. This has two beneficial results. The force on the cam strip 6 is reduced and the accuracy required of the cam contour is reduced also. Both of these effects increase the over-all precision of the enlarger and make adjustment of the flexible cam easier.

When lenses of relatively long focus are used, the follower motion is more nearly comparable to the motion of the lens, resulting in greater demands on the stiffness of the cam strip 6, but the longer focal length of the lens requires less precision in the positioning of the latter relative to the negative carrier, thus compensating for the effect mentioned above.

The change in leverage described above is, I believe, new, and enables me to use the largest possible cam "throw" for all lenses suitable for my enlarger. As an example I can cite the fact that for a two inch lens I obtain a lens motion of three-quarters of an inch with a three inch motion of the cam follower, while for a three inch lens I obtain a one-to-one correlation.

Figure 6:
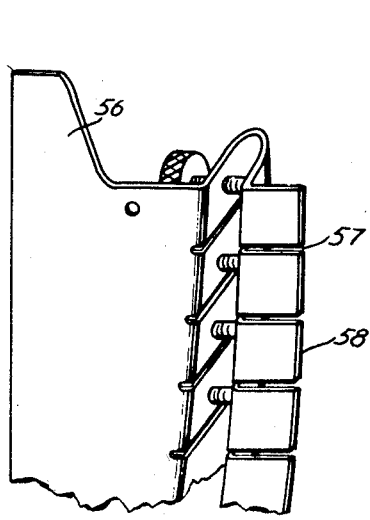
Figure 6 is a perspective view of another type of flexible cam.
Figure 7:
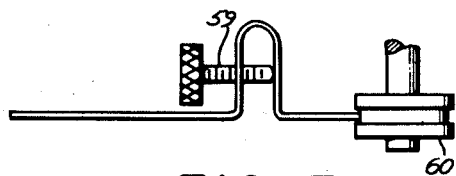
Figure 7 is the plan view of cam of Figure 6.

While I show a preferred form of flexible cam, several other types are suitable for use in my enlarger. Figure 6 shows a one piece cam 56 having a large number of slits 57 cut perpendicular to its working edge 58, with the resulting sectors bent into U-shaped members as shown in Figure 7. By bending the U-shaped portion of these sectors the edge of the cam can be modified slightly to compensate for small differences in lenses and in the dimensions of the various parts. Where very precise control of the bending process is desired, screws 59 may be used in the U-shaped members as shown.

To minimize the effects of the cuts in such cams, the follower wheel 60 should be of relatively large diameter so as to bridge the cuts 57 with little disturbance.

It should be apparent to anyone in the art, that while I described an enlarger, the flexible cam focusing means are suitable to other optical devices as well. Among such are copying cameras, microfilm reading equipment and the like.

Having thus described my invention, I claim:

1. In an optical device comprising means for supporting an image-producing surface, a second surface, a lens arranged to project an image on the said supporting surface onto the said second surface, means for supporting said second surface, means cooperatively arranged between the said two supporting means for changing the relative distance between the two surfaces, cam and follower means arranged to change automatically the distance between the said lens and the said two image-supporting means so that the said projected image is at all times projected in sharp focus onto the image surface of the second of said supporting means, said cam means including a cam made at least partially of deformable material and having a contour adapted to be modified by deforming the said material, and comprising a rigid main body, a flexible member, a plurality of adjustable means connecting said flexible member to said main body at several points along the said flexible member, and lens compensating means connecting said follower to the lens and being so arranged that the relative magnitude of the follower motion and of the lens motion may be varied at will.

2. In an auto focus enlarger, in combination, a first surface for supporting an image, a second surface for receiving a projection of said image, at least one of said surfaces being movable in relation to the other, a lens arranged to project an image from said first to said second surface, means for supporting said surfaces at a selectively variable relative distance from one another, and means operable to alter the distance between said lens and the said first surface in response to a movement between one surface relative to the other, whereby the projected image will be in sharp focus on said second surface in all relative positions of said surfaces, said last named means comprising cam and cam follower means, and guide means for restraining therebetween movement transverse of the cam engagement path, said cam means including a cam made at least partially of deformable material and having a contour of substantially uniform width and modifiable lengthwise by deforming the said material, said cam follower means including a roller, and said guide means having a groove, including a base and side walls extending upwardly from said base, formed in said cam and having a width corresponding to that of said roller, said roller being in rolling contact with the base of said groove and being guided by the said side walls thereof.

3. In an auto focus enlarger, in combination, a first surface for supporting an image, a second surface for receiving a projection of said image, at least one of said surfaces being movable in relation to the other, a lens arranged to project an image from said first to said second surface, means for supporting said surfaces at a selectively variable relative distance from one another, and means operable to alter the distance between said lens and the said first surface in response to a movement between one surface relative to the other, whereby the projected image will be in sharp focus on said second surface in all relative positions of said surfaces, said last named means comprising cam and cam follower means, and guide means for restraining therebetween movement transverse of the cam engagement path, said cam follower means including a roller, and said guide means having a groove engaging between the side walls thereof said cam follower means.

JACOB RABINOW.

REFERENCES CITED

The following references are of record in the file of this patent:

UNITED STATES PATENTS

| Number | Name | Date |
| --- | --- | --- |
| 2,194,384 | Dewey | Mar. 19, 1940 |
| 2,342,737 | Jacobsohn | Feb. 29, 1944 |
| 2,364,362 | Hopkins | Dec. 5, 1944 |
| 2,430,252 | Simmon | Nov. 4, 1947 |
| 2,469,009 | Simmon | May 3, 1949 |